United States Patent
Kalakay, Jr.

(10) Patent No.: US 9,150,387 B2
(45) Date of Patent: Oct. 6, 2015

(54) POSITIVE PENETRATION WOOD HANDLING APPARATUS

(71) Applicant: Fred J. Kalakay, Jr., Fort Wayne, IN (US)

(72) Inventor: Fred J. Kalakay, Jr., Fort Wayne, IN (US)

( * ) Notice: Subject to any disclaimer, the term of this patent is extended or adjusted under 35 U.S.C. 154(b) by 0 days.

(21) Appl. No.: 14/211,061

(22) Filed: Mar. 14, 2014

(65) Prior Publication Data

US 2014/0265388 A1    Sep. 18, 2014

Related U.S. Application Data

(60) Provisional application No. 61/782,599, filed on Mar. 14, 2013.

(51) Int. Cl.
A47H 1/16     (2006.01)
B66C 1/66     (2006.01)

(52) U.S. Cl.
CPC ........................ *B66C 1/66* (2013.01)

(58) Field of Classification Search
CPC ............ E01H 1/12; F16B 45/00; A47J 47/16; A47G 1/20; A47G 25/06; A47F 5/0006; B44D 3/123; F16L 3/04; E06C 9/04; B25H 1/06; B66C 1/10; B66C 1/66
USPC .......................................................... D25/69
See application file for complete search history.

(56) References Cited

U.S. PATENT DOCUMENTS

| | | | |
|---|---|---|---|
| 2,043,716 A * | 6/1936 | Sloan | 24/130 |
| 3,670,789 A | 6/1972 | Long | |
| 4,636,125 A | 1/1987 | Burgard | |
| 4,740,023 A | 4/1988 | Miller | |
| 5,059,077 A | 10/1991 | Schmid | |
| 5,240,353 A | 8/1993 | Bower et al. | |
| 5,439,338 A | 8/1995 | Rosenberg | |
| 5,669,592 A | 9/1997 | Kearful | |
| 6,439,343 B1 * | 8/2002 | Jorges et al. | 182/92 |
| 6,729,437 B1 * | 5/2004 | Apple | 182/92 |
| 6,810,630 B2 | 11/2004 | Chizmas | |
| 6,824,331 B2 | 11/2004 | Parker | |
| 7,673,588 B2 | 3/2010 | Head | |
| 7,686,359 B1 | 3/2010 | Walker | |
| 7,726,619 B2 | 6/2010 | Lien | |
| 8,286,928 B2 * | 10/2012 | Lien | 248/303 |
| 2003/0140739 A1 * | 7/2003 | McKivigan | 81/124.2 |
| 2009/0045012 A1 * | 2/2009 | Mencl | 182/92 |
| 2011/0005148 A1 | 1/2011 | Foster | |

* cited by examiner

*Primary Examiner* — Stephen Vu
(74) *Attorney, Agent, or Firm* — Jeremy N. Gayed

(57) ABSTRACT

An apparatus for positive retention of wood connects to and retains wood for transport and handling, the apparatus comprising a drive handle connected to a support member, the support member connected a main shank, and the main shank adapted to positively penetrate wood through one or more of impact and rotation, wherein the main shank forms a connection to the wood after such positive penetration is achieved.

7 Claims, 3 Drawing Sheets

POSITIVE PENETRATION WOOD HANDLING APPARATUS

CROSS-REFERENCES TO RELATED APPLICATIONS

This application is a non-provisional of, claims priority to, and incorporates in its entirety previously-filed U.S. Provisional Application No. 61/782,599, filed on Mar. 14, 2013. This application is related to PCT/US14/27306, Positive Penetration Wood Handling Apparatus, filed on Mar. 14, 2014.

STATEMENT REGARDING FEDERALLY SPONSORED RESEARCH OR DEVELOPMENT

Not applicable

BACKGROUND

The related art of interest describes various wood and log handling apparatus used for dragging and lifting wood. Existing apparatuses, including but not limited to chains, tongs, hooks, clamps, vice, log claw and timber carriers, suffer notable deficiencies. For example, wood handling apparatuses known to the art often fail to achieve positive penetration into wood. Such apparatuses are also frequently unable to maintain a secure hold when the angle of force between the handling apparatus and the item being handled changes, such as when a handling apparatus is used to assist dragging a log across the ground or positioning it for splitting in a log splitter. Known apparatuses are required to be repositioned virtually every time the angle or orientation of the item to be handled is changed. Many handling apparatuses known to the art rely on resistant force to connect to the item being handled, such as tongs and clamps. Such apparatuses often are or become insecure during the handling procedure, and the connection based entirely on resistant contact is prone to slippage or failure.

There is a need in the art for a wood handling apparatus that anchors securely to wood, is easy to attach, and maintains a secure connection without needing to be repositioned or reattached when the angle of force between the apparatus and wood being handled changes, such as during dragging, lifting, and positioning.

SUMMARY

The present invention addresses this need by providing an ergonomic, quickly attachable wood handling apparatus that provides a secure connection through positive penetration for lifting, dragging, shifting, twisting, rotating, or otherwise moving wood to be handled without needing to readjust or reposition the apparatus when the wood changes angle or orientation. In some embodiments, the present invention comprises a main shank connected to a support member, with the support member connected to a drive handle. Optionally, a connection member may also be connected at one end to the support member and at the other end to one or more of the drive handle and the main shank.

In a preferred embodiment, the main shank is threaded and pointed to facilitate penetration into wood. The main shank is connected to a support member, which support member comprises a member bisecting the drive handle. In a preferred embodiment, the support member is a bar that is, when viewed from an edge-on perspective, U shaped. The support member is connected to a drive handle, which comprises a handle adapted to facilitate grasping and the exertion of rotational force on the apparatus by a user. In a preferred embodiment, the drive handle comprises a wheel. Said support member further optionally connects to a connection member, which comprises a rod, strut, or other connection point adapted to facilitate connection of the apparatus to a cable, hoist, lift, rope, or other transportation means. In a preferred embodiment, the connection member is a bent strut attached at one end to the lowermost portion of the support member and at the other end to the drive handle. Optionally, the drive handle can comprise the connection member. The connection member can optionally be used as a handle for handling of the wood to which the apparatus is connected, or can be interfaced with a hook, chain, cleavice, swivel, cable, sling or rope for further handling.

BRIEF DESCRIPTION OF THE DRAWINGS

These and other features, aspects and advantages of the present invention will become better understood with regard to the following description and accompanying drawings, where.

DESCRIPTION

The present invention relates to embodiments of a wood handling apparatus that provides a secure connection for lifting, dragging, shifting, twisting, rotating, or otherwise moving wood to be handled without needing to readjust or reposition the apparatus when the wood changes angle or orientation. The apparatus taught herein comprises a main shank connected to a support member, a support member connected to a drive handle, said support member also optionally connected to a connection member to facilitate handling or lifting of the apparatus by hand, or by cable, hook, cleavice, or other similar device.

"Wood" as used herein includes all wood and wood-like materials, regardless of shape, size, purpose, or general composition, desired to be handled and known to those skilled in the art to be capable of retaining a screw or lag screw. "Wood" includes but is not limited to stumps, logs, branches, limbs, posts, joists, rafters, runners, boards, trim, dimensional lumber, rough-cut lumber, and wood-like composites.

Figure 1:
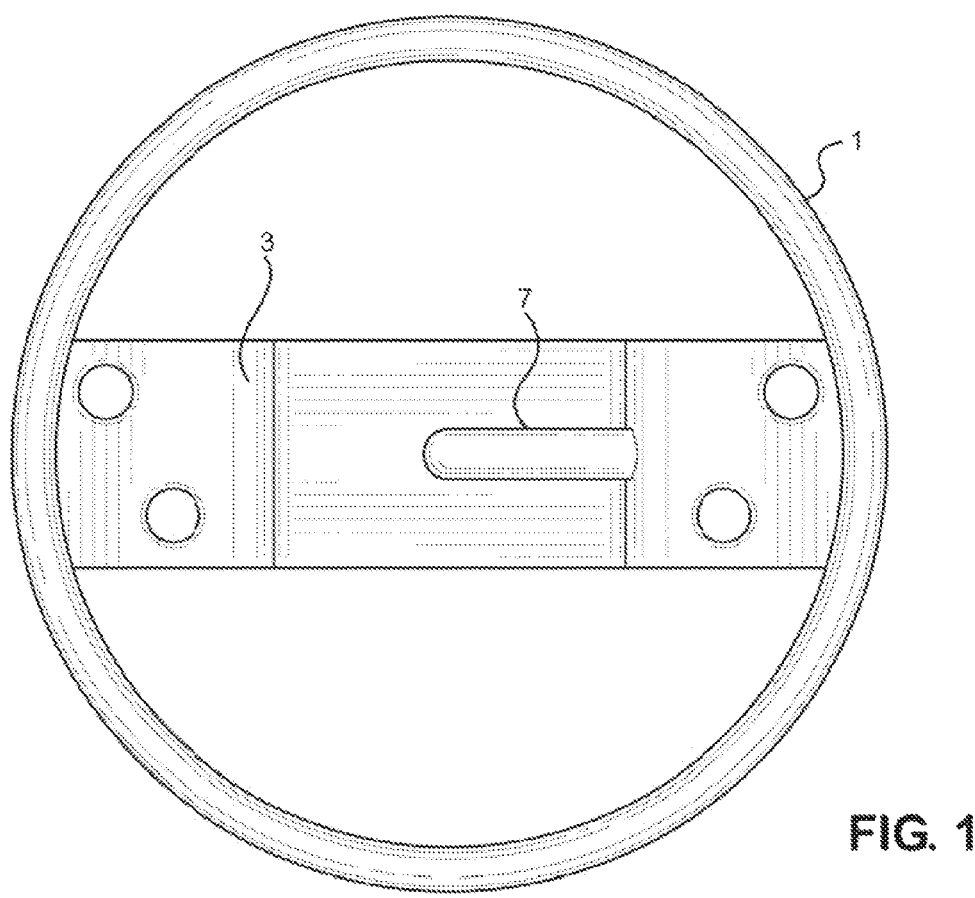
FIG. 1 is a top-down view of a preferred embodiment of the present invention.
Figure 2:
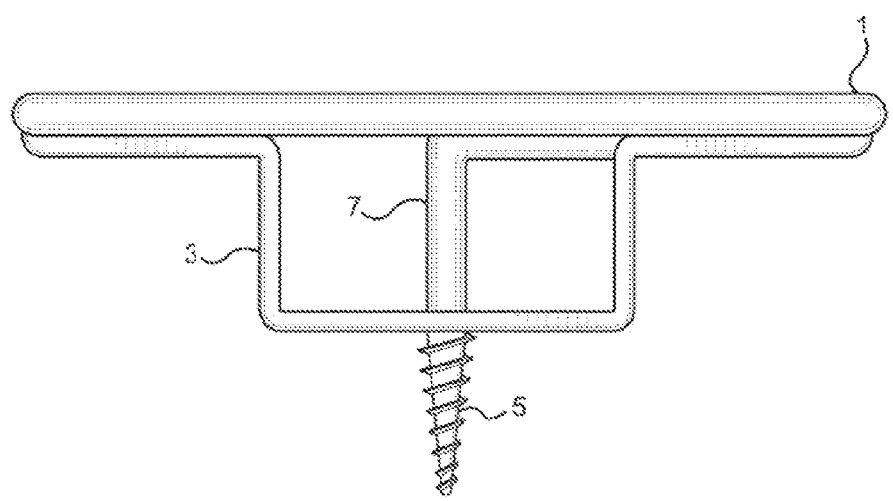
FIG. 2 is a side view of a preferred embodiment of the present invention.
Figure 3:
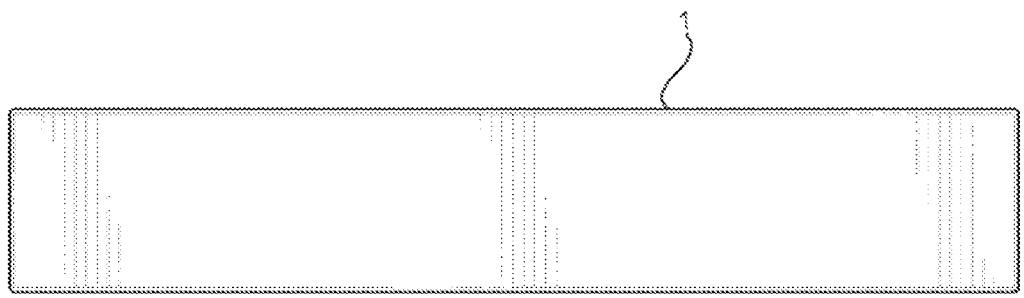
FIG. 3 is a top-down view of one alternative embodiment of the present invention, in which the drive handle comprises a bar.
Figure 4:
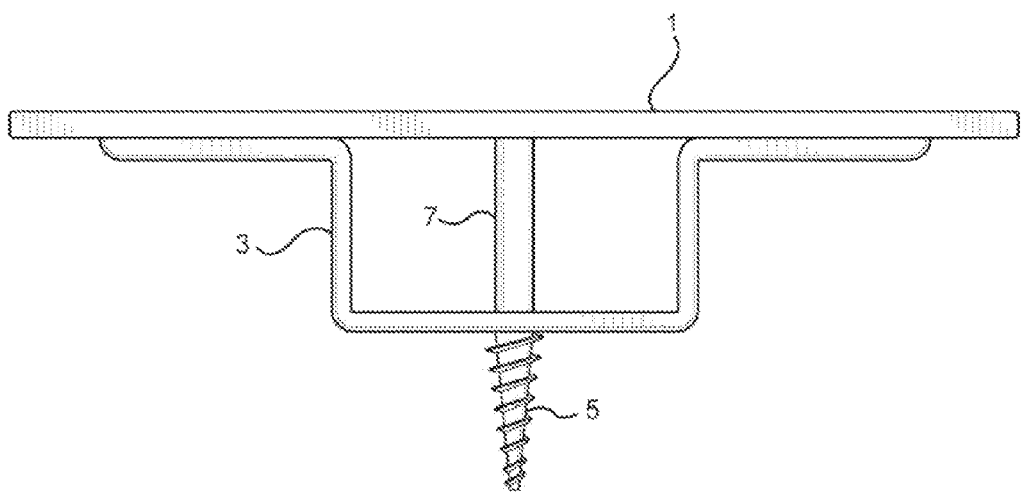
FIG. 4 is a side view of one alternative embodiment of the present invention, in which the drive handle comprises a bar.
Figure 5:
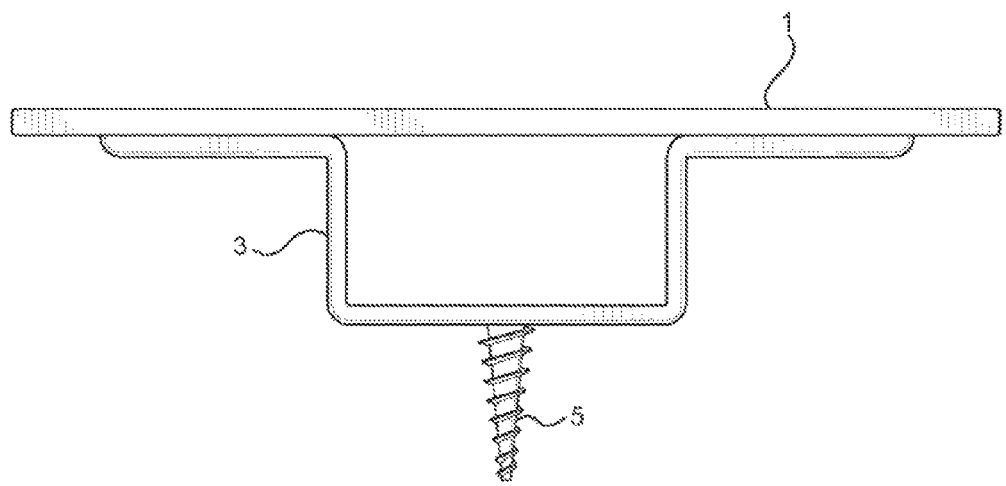
FIG. 5 is a side view of one alternative embodiment of the present invention, in which the drive handle also comprises the connection member.
Figure 6:
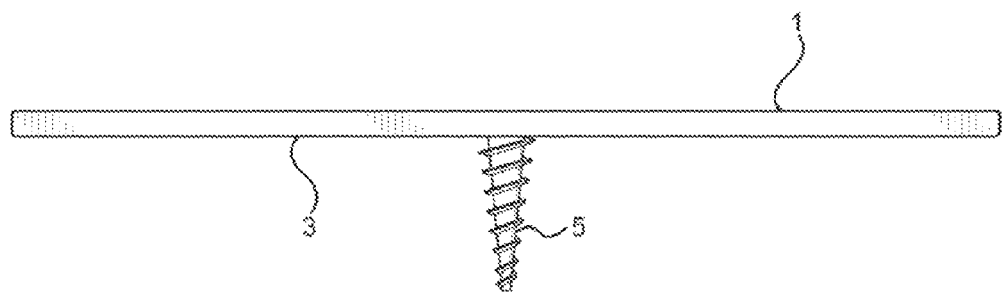
FIG. 6 is a side view of one alternative embodiment of the present invention, in which the drive handle also comprises the support member.

As shown in FIGS. 1 and 2, in a preferred embodiment the invention is a wood handling apparatus comprising a drive handle [1] connected to a support member [3]. The support member [3] is connected to a main shank [5]. The support member is in this embodiment further connected to a connection member [7]. The connection member [7] is in this embodiment a bent strut, connected at one end to the support member [3] and at the other end to the drive handle [1], thereby forming a secondary handle or an attachment point for a cable, hook, rope, sling, swivel, carabineer, cleavice, or other similar device. In this preferred embodiment the drive handle [1] is a wheel, although it will be appreciated that other shapes and geometries of drive handle may be used within the scope of the present invention. In this embodiment, the support member [3] is a bar bisecting the drive handle that is "U-shaped" when viewed from an edge-on perspective with reference to the apparatus, although it will be appreciated that other structures may be used within the scope of the invention, so long as they are adapted to permit the exertion of rotational force on the shank [5] by exerting force against the drive handle [1]. For example, the support member [3] could optionally comprise a straight bar bisecting the diameter of the drive handle [1], or a bent or straight bar extending only the length of the radius of the circle described by a circular drive handle [1] to connect the drive handle [1] to a shank located at the center of the circle described by a circular drive handle [1]. The main shank [5] is preferably a conical, pointed, threaded shank, of sufficient thickness and with sufficiently coarse threads to facilitate the lifting of heavy wood. It will be appreciated that unthreaded shanks, shanks of other shapes, and shanks with varying thread coarseness are within the scope of the invention, provided that the shanks is adapted to achieve positive penetration into wood to form a connection to wood through impact, rotation, or a combination of impact and rotation.

Optionally, embodiments herein may comprise a connection member [7]. In such embodiments, the connection member [7] comprises generally a strut or bar, preferably bent, connected at one end to the support member [3] and at the other end to one or more of the main shank [5] or drive handle [1] such that the connection member serves as a secondary handle or a connection point for a hook, chain, swivel, rope, sling, cable, hook, carabineer, cleavice, or other similar device. It will be recognized by one skilled in the art that the drive handle [1] itself, the support member [3] itself, or any aperture or protrusion on the support member [3] or drive handle [1] capable of facilitating connection of the apparatus with a hook, chain, cleavice, swivel, cable, sling or rope for further handling can comprise the optional connection member [7].

In use, the embodiment of the present invention shown in FIGS. 1 and 2 would operate as follows: a fireplace log is lying on the ground in the horizontal position. The apparatus is grasped using both hands on the drive handle [1]. The main shank [5] of the apparatus is pushed against the side of the log. The drive handle [1] rotated to achieve positive penetration of the main shank [5] into the wood. Rotation is continued until the support member [3] contacts the wood. The apparatus can then be used to lift, drag, or otherwise manipulate the log, including by attaching cables or hoists to the connection member [7] or drive handle [ ] for the purpose of moving the log through mechanical force.

Although the present invention is described with reference to specific embodiments herein, it will be appreciated by one skilled in the art that other sizes, shapes, configurations, and methods may be used within the scope and spirit of the claims herein.

What is claimed is:

1. An apparatus for positive retention of wood, said apparatus comprising:

(a) a drive handle comprising a wheel connected to a support member, wherein said support member comprises at least one of a bar bisecting said drive handle and a rod bisecting said drive handle, and wherein said support member is generally U-shaped;

(b) a support member connected to a threaded, generally conically shaped main shank adapted to positively penetrate wood through one or more of impact and rotation, wherein the mum shank forms a connection to the wood after such positive penetration is achieved and comprises a wide end adjacent to said support member and a narrow end opposite said support member;

(c) wherein the center of said main shank wide end and the center of said main shank narrow end define a longitudinal axis, and said longitudinal axis is substantially perpendicular to said drive handle; and a connection member connected at a connection member first end to a first location on said support member and connected at a connection member second end to a second location on said drive handle.

2. The apparatus of claim 1, wherein said connection member comprises at least one of a bent bar and a bent rod.

3. The apparatus of claim 1, further comprising a connection member connected at a connection member first end to a first location on said support member and connected at a connection member second end to a second location on said support member.

4. The apparatus of claim 3, wherein said connection member comprises at least one of a bent bar and a bent rod.

5. An apparatus for positive retention of wood, said apparatus comprising:

(a) a drive handle comprising at least one of a bar and a rod, said drive handle connected to a support member;

(b) said support member comprising a generally U-shaped member connected at a support member first end to a first location on said drive handle and connected at a support member second end to a second location on said drive handle, said support member further connected to a generally conically shaped threaded main shank;

(c) wherein said main shank is adapted to positively penetrate wood through one or more of impact and rotation, said main shank forms a connection to the wood after such positive penetration is achieved, and said main shank comprises a vide end adjacent to said support member and a narrow end opposite said support member;

(d) wherein the center of said wide end and the center of said narrow end define an axis and said axis is substantially perpendicular said drive handle; and (e) said apparatus farther comprises a connection member connected at a connection member first end to a third location on said support member and connected at connection member second end to a fourth location on said drive handle.

6. The apparatus of claim 5, wherein said connection member comprises at least one of a bent bar and a bent rod.

7. The apparatus of claim 5, wherein said connection member comprises at least one of a straight bar and a straight rod.

* * * * *